United States Patent
Hoover (10) Patent No.: US 11,912,183 B2
(45) Date of Patent: Feb. 27, 2024

(54) SHAFT LOCKING METHOD USING A GEAR RACK AND TOOTHED LOCKING LEVER

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Sprints, CO (US)

( * ) Notice: Subject to any disclaimer, the term of this patent is extended or adjusted under 35 U.S.C. 154(b) by 86 days.

(21) Appl. No.: 17/510,024

(22) Filed: Oct. 25, 2021

(65) Prior Publication Data

US 2023/0126209 A1   Apr. 27, 2023

(51) Int. Cl.
| | |
|---|---|
| *B60N 2/75* | (2018.01) |
| *A47C 1/03* | (2006.01) |
| *A47C 7/54* | (2006.01) |
| *F16B 21/00* | (2006.01) |

(52) U.S. Cl.
CPC ............ *B60N 2/763* (2018.02); *A47C 1/0303* (2018.08); *A47C 7/541* (2018.08); *B60N 2/77* (2018.02); *F16B 21/00* (2013.01)

(58) Field of Classification Search
CPC ......... B60N 2/77; B60N 2/763; B60N 2/773; B60N 2002/2204; A47C 7/541; A47C 7/402; A47C 1/0305; A47C 1/0303; F16B 21/00
USPC ......... 297/411.36, 411.37, 410, 353, 411.35; 248/408, 423, 407, 409
See application file for complete search history.

(56) References Cited

U.S. PATENT DOCUMENTS

| | | | | |
|---|---|---|---|---|
| 5,094 A | * | 5/1847 | Mathewson ........... | A21B 1/245 126/1 C |
| 1,237,145 A | * | 8/1917 | Andrus ................... | A47C 3/26 248/408 |
| 1,407,174 A | * | 2/1922 | Simpson ................ | B60N 2/783 248/404 |
| 1,867,600 A | * | 7/1932 | Schwarzkopf ........... | A47C 1/06 297/410 |
| 2,909,212 A | * | 10/1959 | Scherer ..................... | A47C 3/26 248/408 |

(Continued)

FOREIGN PATENT DOCUMENTS

| | | | |
|---|---|---|---|
| KR | 20020015604 A | 2/2002 | |
| KR | 20190069732 A | 6/2019 | |
| TW | M440704 U1 * | 11/2012 | ........... A47C 1/0305 |

OTHER PUBLICATIONS

Extended European Search Report dated Feb. 22, 2023, European Application No. 22203633.7.

*Primary Examiner* — Milton Nelson, Jr.

(74) *Attorney, Agent, or Firm* — Suiter Swantz pc llo (57) ABSTRACT

A shaft locking mechanism includes a rack disposed on a translating shaft and a toothed locking lever disposed on a corresponding translation post. The toothed locking lever engages the rack in a locked orientation to prevent the shaft translating within the translation post. The toothed locking lever is disengaged during translation and the shaft may be translated and locked in place with very granular adjustability. A control rod release mechanism may be biased to maintain the toothed locking lever in the locked orientation. A cam feature on the toothed locking lever engages the body of the control rod which defines a recessed portion that coincides with the cam while in an unlocked orientation.

15 Claims, 8 Drawing Sheets

(56) References Cited

U.S. PATENT DOCUMENTS

| | | | | |
|---|---|---|---|---|
| 4,815,688 A | * | 3/1989 | Wood | A61G 5/1094 |
| | | | | 248/283.1 |
| 5,590,929 A | * | 1/1997 | Hamelin | B60N 2/818 |
| | | | | 297/216.12 |
| 7,896,440 B2 | * | 3/2011 | Tsai | A47C 1/0305 |
| | | | | 297/411.36 |
| 2008/0277991 A1 | | 11/2008 | Liu et al. | |

* cited by examiner

SHAFT LOCKING METHOD USING A GEAR RACK AND TOOTHED LOCKING LEVER

BACKGROUND

Mechanisms to secure shafts at various points of translation are complicated, unreliable, or compromised. Existing mechanisms often use friction to secure the shaft to the housing it rides in. Friction is problematic where the load input is high; the frictional interface may fail catastrophically, and without warning. Some mechanisms utilize a pin engaging holes in the shaft at various points; such mechanisms offer limited adjustability and compromise the structural integrity of the shaft. Other designs use complex mechanical interfaces to lock a shaft which are costly and unreliable. A highly adjustable, reliable, positive lock mechanism is needed.

SUMMARY

In one aspect, embodiments of the inventive concepts disclosed herein are directed to a shaft locking mechanism having a rack disposed on a translating shaft and a toothed locking lever disposed on a corresponding translation post. The toothed locking lever engages the rack in a locked orientation to prevent the shaft translating within the translation post. The toothed locking lever is disengaged during translation and the shaft may be translated and locked in place with very granular adjustability. A control rod release mechanism may be biased to maintain the toothed locking lever in the locked orientation.

In a further aspect, a cam feature on the toothed locking lever engages the body of the control rod which defines a recessed portion that coincides with the cam while in an unlocked orientation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not 'necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a shaft locking mechanism having a rack disposed on a translating shaft and a toothed locking lever disposed on a corresponding translation post. The toothed locking lever engages the rack in a locked orientation to prevent the shaft translating within the translation post. The toothed locking lever is disengaged during translation and the shaft may be translated and locked in place with very granular adjustability. A control rod release mechanism may be biased to maintain the toothed locking lever in the locked orientation.

Figure 1:
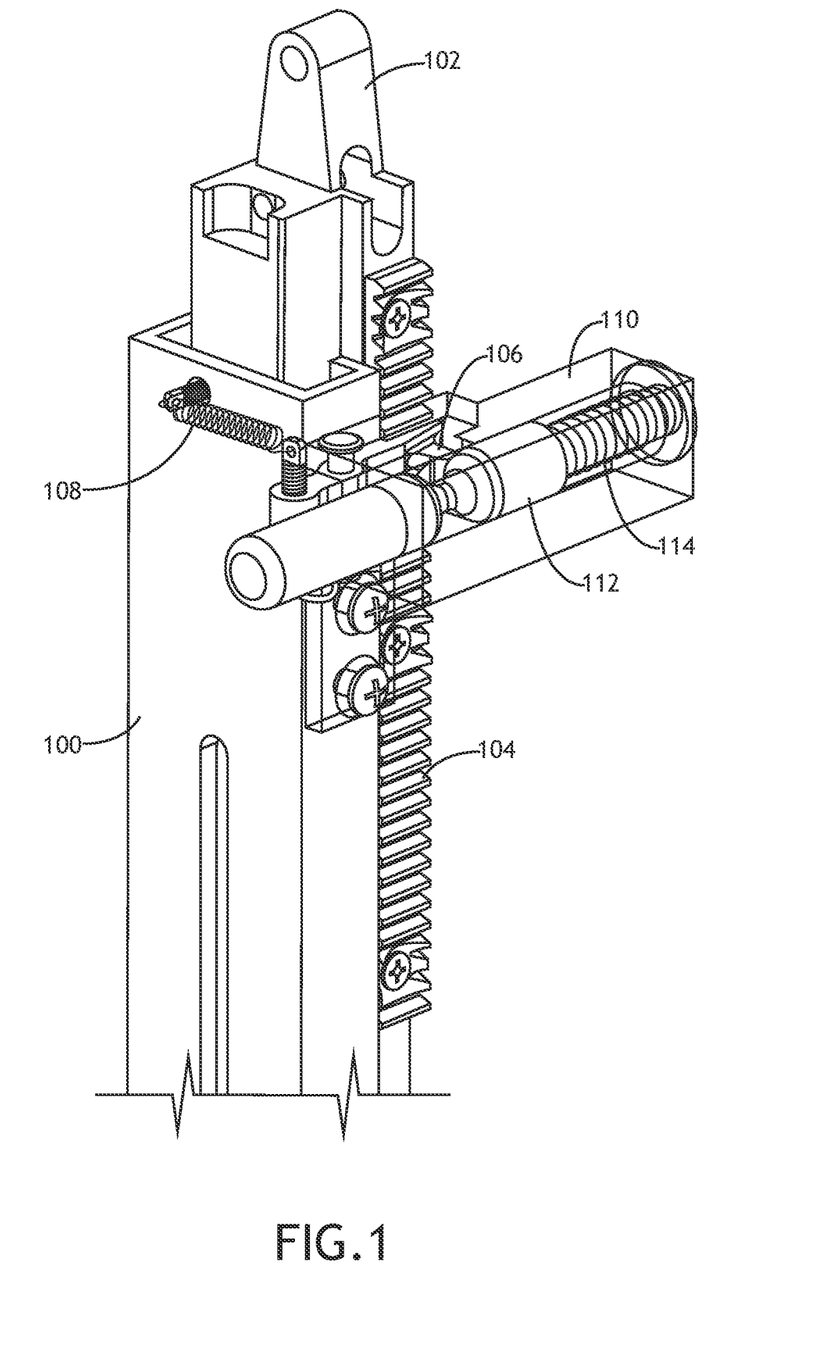
FIG. 1 shows a perspective view of a shaft locking mechanism according to an exemplary embodiment.

Referring to FIG. 1, a perspective view of a shaft locking mechanism according to an exemplary embodiment is shown. In a translating mechanism including a relatively stationary post 100 and translating shaft 102, a locking mechanism maintains the shaft 102 in a relative translational position with respect to the post 100. The locking mechanism includes a rack 104 disposed on the shaft 102 and a toothed locking lever 106 disposed on the post 100. The toothed locking lever 106 defines teeth (obscured) corresponding to the teeth defined by the rack 104. In a locked orientation, the toothed locking lever 106 is maintained in an orientation such that the teeth on the toothed locking lever 106 engage the rack 104 and prevent the shaft 102 from translating; in an unlocked orientation, the teeth of the toothed locking lever 106 are disengaged from the rack 104 so that the shaft 102 may translate freely.

In at least one embodiment, a control block 110 houses the toothed locking lever 106 and defines a pivot range of the toothed locking lever 106. At one extreme, the teeth of the toothed locking lever 106 positively engage the rack 104; while at the other extreme, the teeth are completely disengaged from the rack 104. The toothed locking lever 106 may be biased via a locking lever biasing element 108 such as a spring or linear actuator. In one embodiment, the locking lever biasing element 108 may bias the toothed locking lever 106 toward an engaged state; alternatively, the locking lever biasing element 108 may bias the toothed locking lever 106 toward a disengaged state.

In at least one embodiment, a control rod 112 is maintained within the control block 110 to control the state of the toothed locking lever 106 (engaged to the rack 104 or disengaged from the rack 104) as more fully described herein. The control rod 112 may be biased via a control rod biasing element 114, such as a spring or linear actuator, to maintain the toothed locking lever 106 in an engaged state.

Because of the continuous nature of the rack 104 and the relatively small size of the teeth, the rack 104 and toothed locking lever 106 will reengage no matter where the shaft 102 is within the full range of translation with respect to the post 100.

Figure 2:
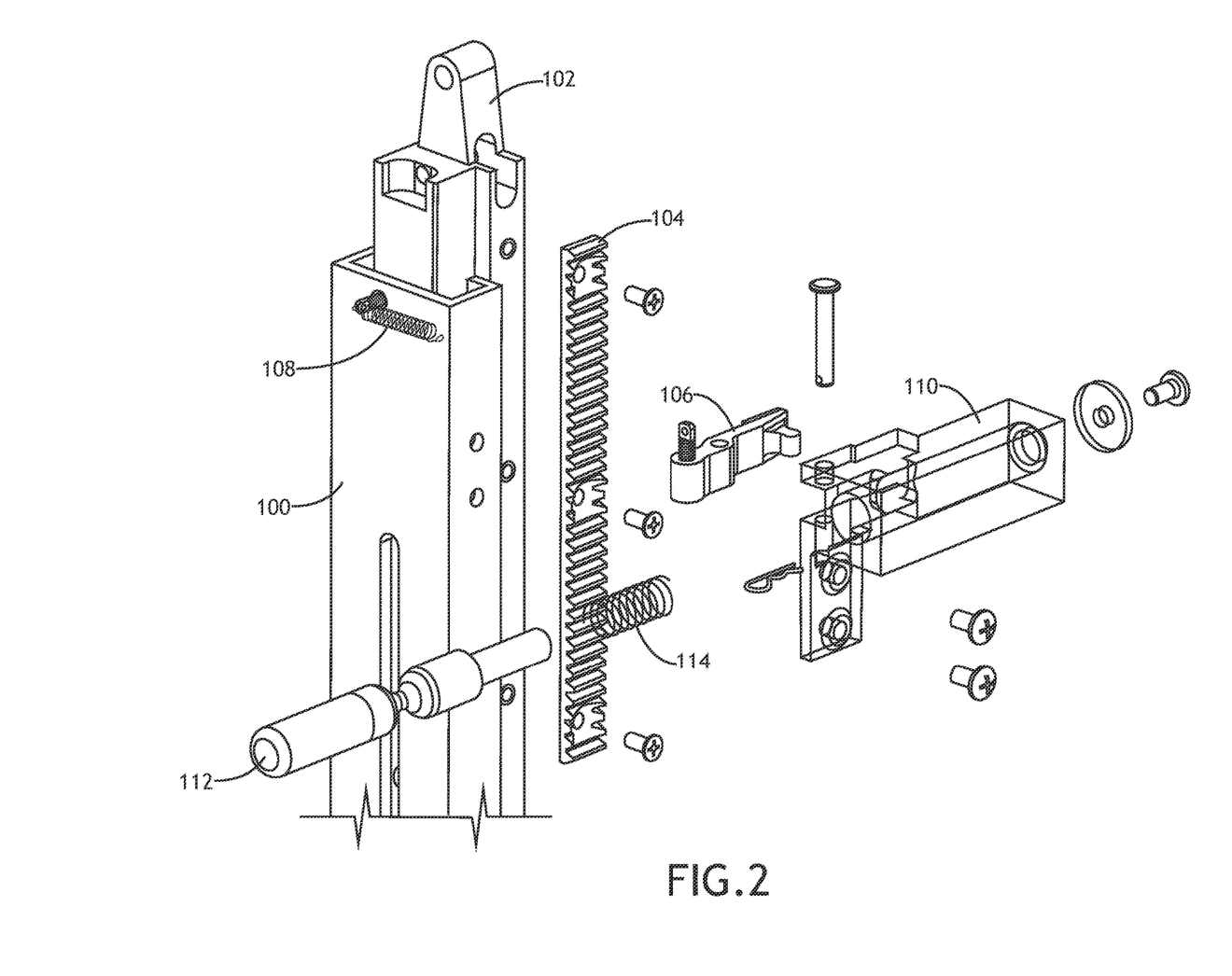
FIG. 2 shows a perspective, exploded view of a shaft locking mechanism according to an exemplary embodiment.

Referring to FIG. 2, a perspective, exploded view of a shaft locking mechanism according to an exemplary embodiment is shown. The rack 104 may be defined by the shaft 102 or releasably or permanently affixed to the shaft 102 at a surface to allow the locking mechanism to releasably engage the rack 104. In at least one embodiment, the control block 110 may define flanges for pivotably engaging the toothed locking lever 106 via a pin. In one embodiment, the locking lever biasing element 108 biases the toothed locking lever 106 toward at pivot position defining a disengaged state so that the shaft 102 may translate freely. The control rod 112 is biased via the control rod biasing element 114 push the toothed locking lever 106 into the rack 104. Pushing the control rod 112 into the control block 110 allows the toothed locking lever 106 to disengage from the rack 104.

Figure 3A:
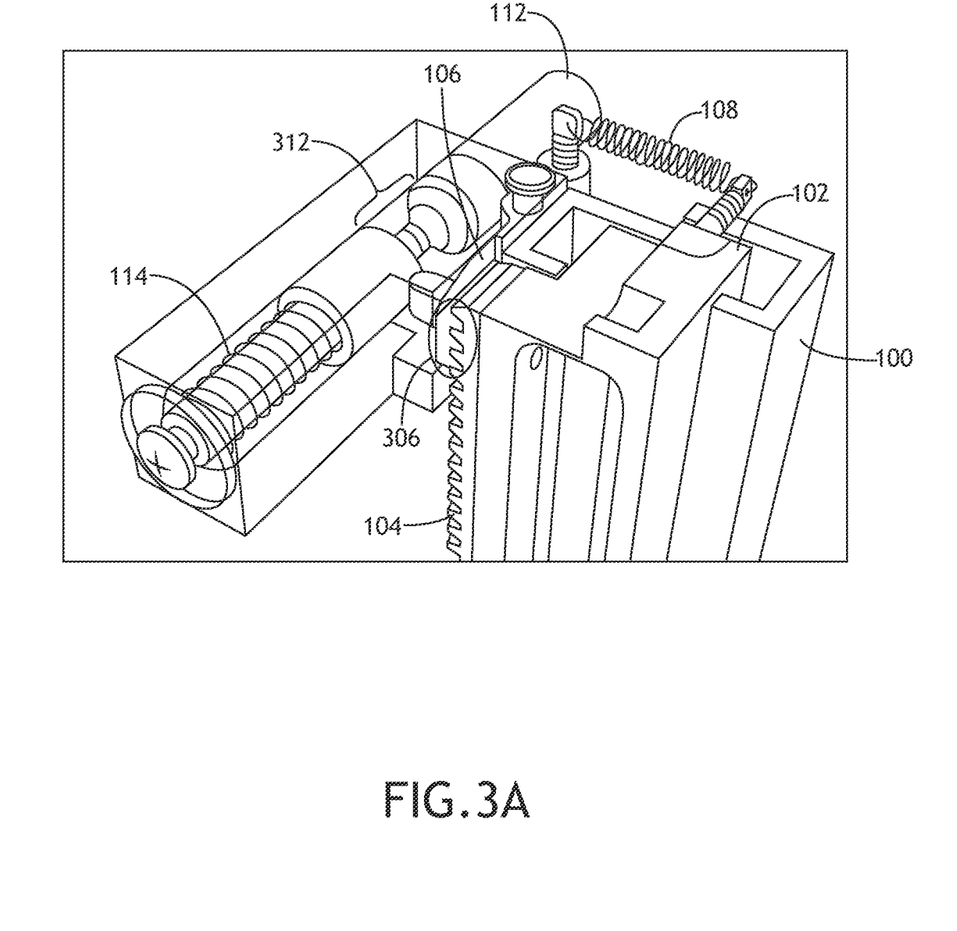
FIG. 3A shows a detail perspective view of a shaft locking mechanism according to an exemplary embodiment.
Figure 3B:
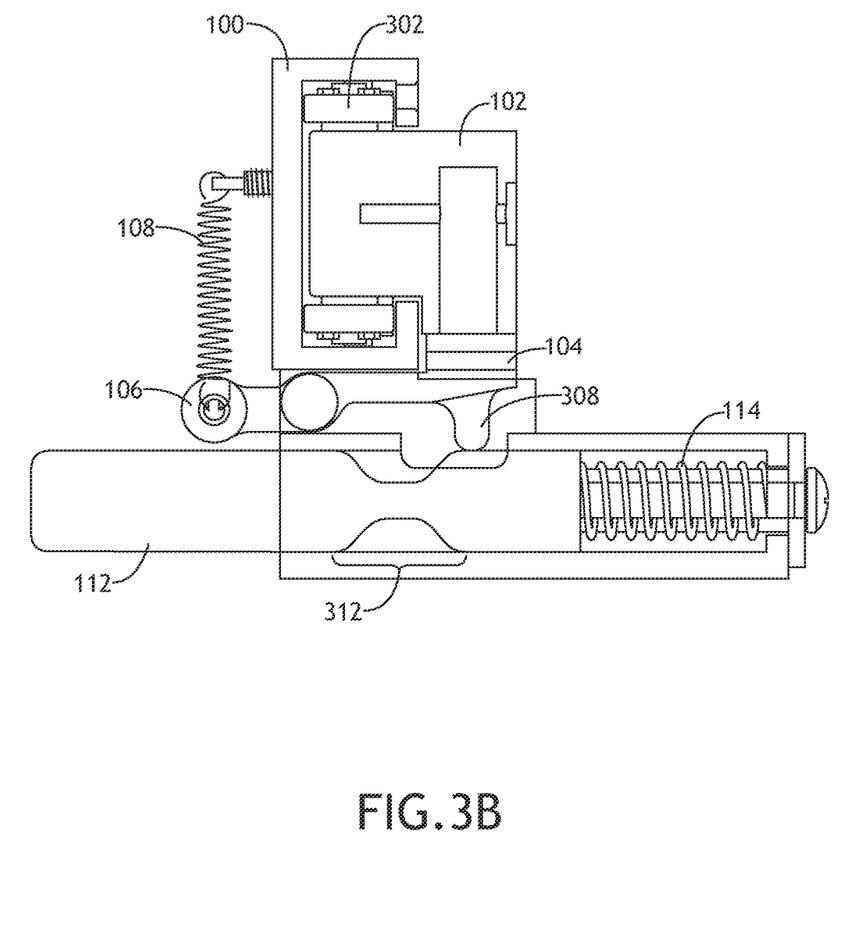
FIG. 3B shows a detail top view of a shaft locking mechanism according to an exemplary embodiment.

Referring to FIGS. 3A-3B, a detail perspective view and top view of a shaft locking mechanism according to an exemplary embodiment are shown. In a system with a translating shaft 102 and bearings 302 within a relatively stationary post 100, and a locking mechanism with a rack 104 disposed on the shaft 102 and a toothed locking lever 106 pivotably disposed on a control block disposed on the post 100, a control rod 112 controls the state of the toothed locking lever 106 (either engaged or disengaged from the rack 104). The toothed locking lever 106 includes or defines a set of teeth 306 disposed and oriented to engage the rack 104 when in a locked orientation.

In at least one embodiment, a locking lever biasing element 108 biases the toothed locking lever 106 to an unlocked, disengaged orientation. The control rod 112 defines a body that slides linearly within the control block, and generally biased via a control rod biasing element 114 such that a portion of the body engages a cam element 308 disposed on the toothed locking lever 106 to push the teeth 306 into the rack and lock the shaft 102. Intermeshing of the teeth 306 and the rack 104 render back drive effectively impossible.

In at least one embodiment, the control rod 112 defines a recessed portion 312 disposed to engage the cam element 308 and thereby allow the locking lever biasing element 108 to disengage the teeth 306 of the toothed locking lever 106 from the rack 104. In at least one embodiment, the recessed portion 312 may defined sloped sides to gradually push the toothed locking lever 106 back to the locked orientation as the control rod 112 is pushed back to a neutral position by the control rod biasing element 114. In at least one embodiment, the control rod 112 and recessed portion 312 may define an hourglass shape. The locking lever biasing element 108 ensures the cam element 308 maintains positive contact with the surface of the control rod 112.

Figure 4A:
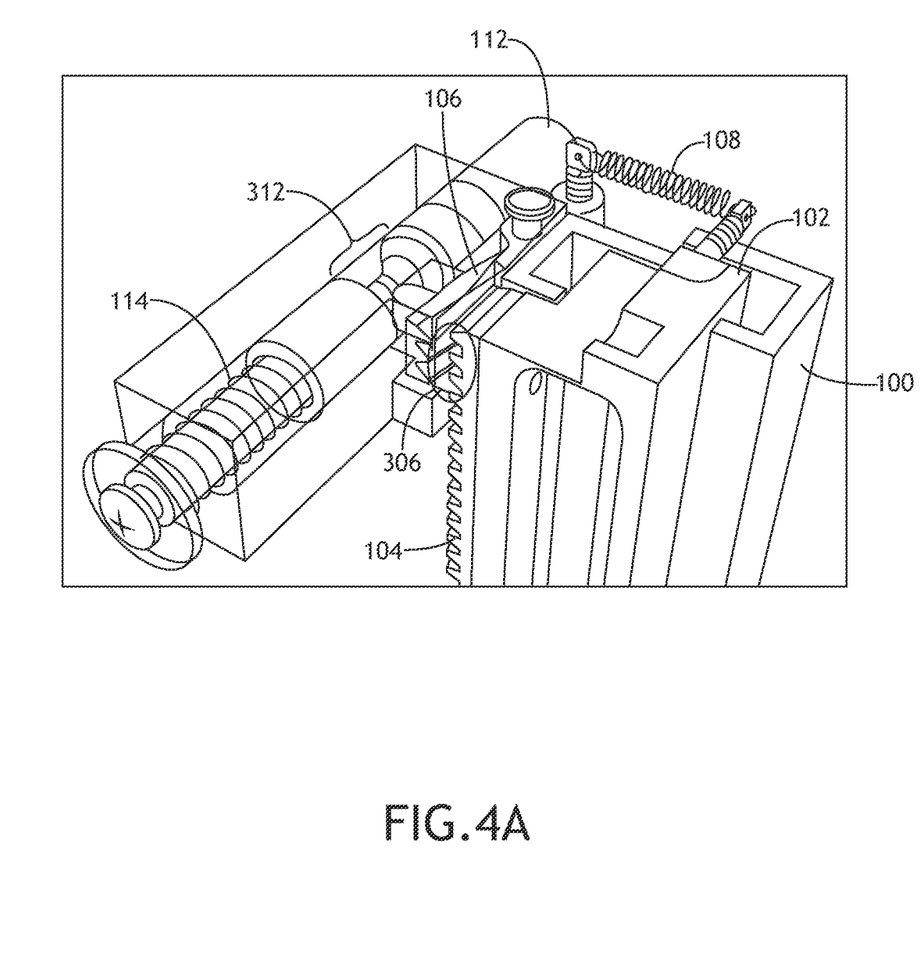
FIG. 4A shows a detail perspective view of a shaft locking mechanism according to an exemplary embodiment.
Figure 4B:
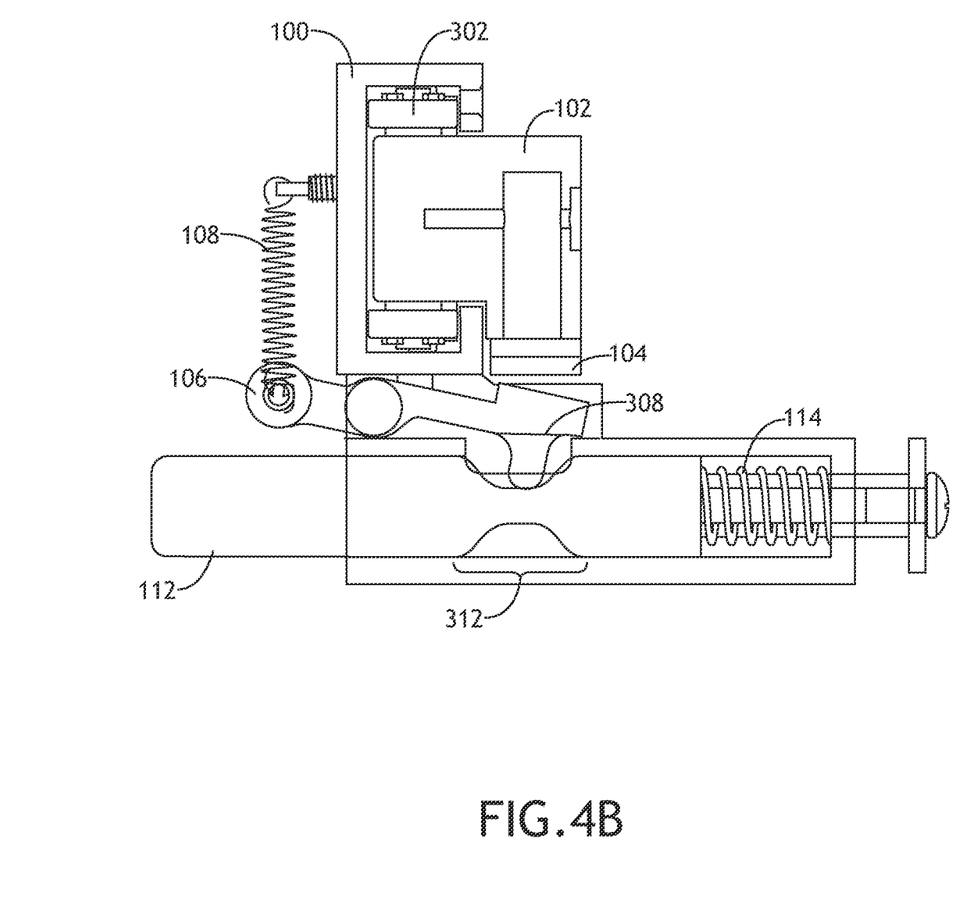
FIG. 4B shows a detail top view of a shaft locking mechanism according to an exemplary embodiment.

Referring to FIGS. 4A-4B, a detail perspective view and top of a shaft locking mechanism according to an exemplary embodiment are shown. The locking mechanism is shown in an unlocked, disengaged orientation where the cam element 308 coincides with the recessed portion 312 so that the locking lever biasing element 108 disengages the teeth 306 from the rack 104.

Figure 5A:
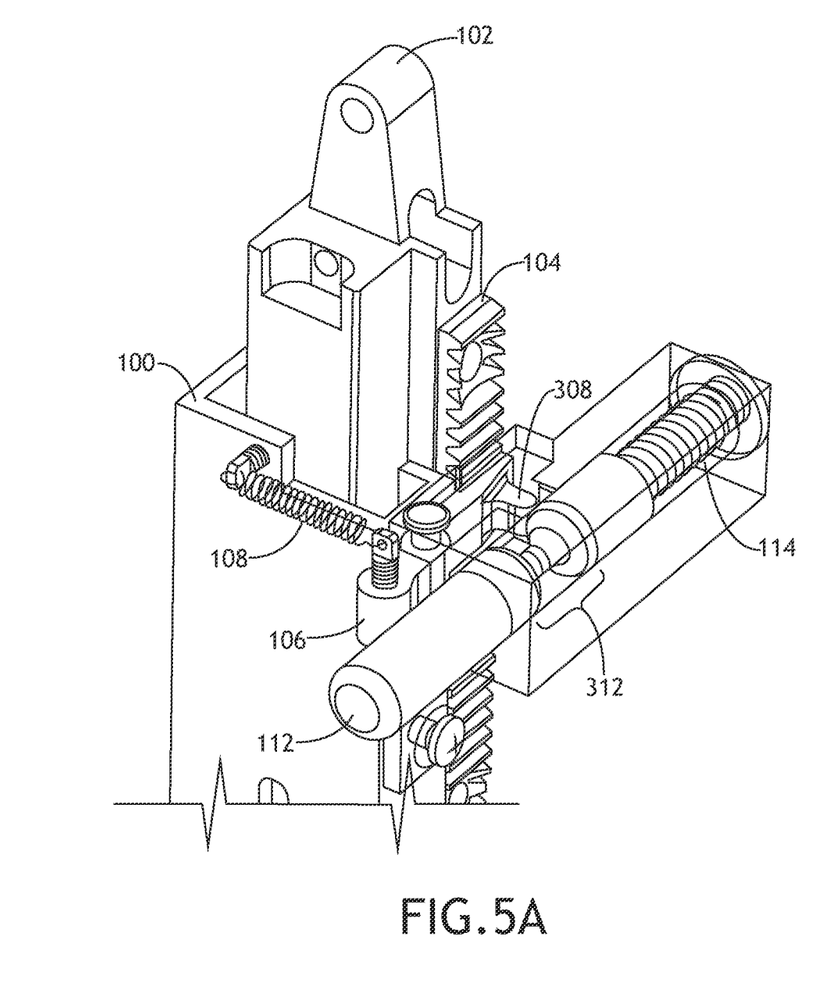
FIG. 5A shows a perspective view of a shaft locking mechanism according to an exemplary embodiment.
Figure 5B:
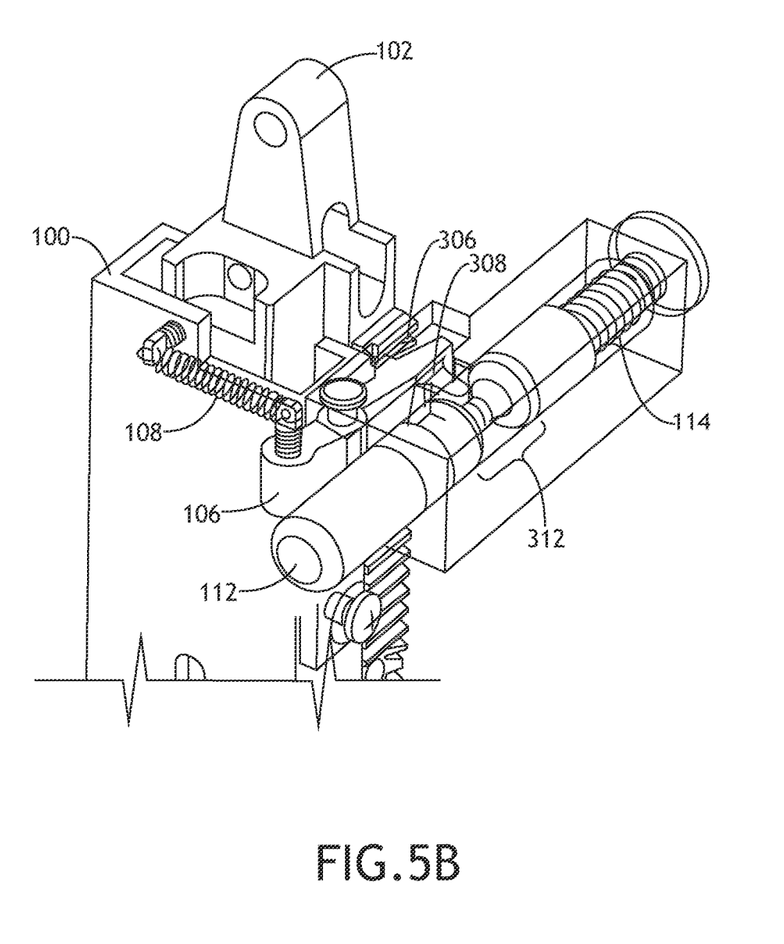
FIG. 5B shows a perspective view of a shaft locking mechanism according to an exemplary embodiment.

Referring to FIGS. 5A-5B, perspective views of a shaft locking mechanism according to an exemplary embodiment are shown. The shaft 102 according to embodiments disclosed herein may be translated linearly and continuously with the operating range of the shaft 102 and post 100. The small size of the teeth 306 and rack 104 and the sloped nature of the recessed portion 312 and cam element 308 force the teeth 306 to engage the rack 104 when the control rod 112 is being biased back toward the engaged, neutral orientation, so that highly granular positioning is possible with substantially no possibility of back drive or tension slip.

Embodiments of the present disclosure offer a highly adjustable shaft translation locking mechanism. Embodiments may be useful for adjustable aircraft seat armrests, however any application where positive locking of a translating component are envisioned.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A translation locking apparatus comprising:
a rack;
a locking lever including a set of teeth configured to engage the rack;
a control block;
a control rod configured to translate linearly within the control block; and
a control rod biasing element configured to bias the control rod into a locked orientation,
wherein:
the rack is disposed on a linearly translating shaft;
the locking lever is disposed on a substantially stationary post;
the locking lever defines an engaged orientation where the teeth engage the rack and a disengaged orientation where the teeth disengage from the rack; and
the control rod is configured to force the locking lever into the engaged orientation when in the locked orientation.

2. The translation locking apparatus of claim 1, further comprising a locking lever biasing element configured to bias the locking lever into the engaged orientation.

3. The translation locking apparatus of claim 1, wherein the locking lever includes a cam element disposed to maintain contact with a surface of the control rod.

4. The translation locking apparatus of claim 3, wherein the control rod defines a recessed portion disposed to coincide with the cam element when in an unlocked orientation.

5. The translation locking apparatus of claim 1, further comprising a locking lever biasing element configured to bias the locking lever into the disengaged orientation.

6. A translating mechanism comprising:
a post;
a translating shaft; and
a translating locking mechanism comprising:
a rack;
a locking lever including a set of teeth configured to engage the rack;
a control block;
a control rod configured to translate linearly within the control block; and
a control rod biasing element configured to bias the control rod into a locked orientation,
wherein:
the rack is disposed on the shaft;
the locking lever is disposed on the post;
the locking lever defines an engaged orientation where the teeth engage the rack and a disengaged orientation where the teeth disengage from the rack; and
the control rod is configured to force the locking lever into the engaged orientation when in the locked orientation.

7. The translating mechanism of claim 6, wherein the locking lever includes a cam element disposed to maintain contact with a surface of the control rod.

8. The translating mechanism of claim 7, wherein the control rod defines a recessed portion disposed to coincide with the cam element when in an unlocked orientation.

9. The translating mechanism of claim 6, the translating locking mechanism further comprising a locking lever biasing element configured to bias the locking lever into the disengaged orientation.

10. The translating mechanism of claim 6, the translating locking mechanism further comprising a locking lever biasing element configured to bias the locking lever into the engaged orientation.

11. An armrest comprising:
a post;
a translating shaft; and
a translating locking mechanism comprising:
a rack;
a locking lever including a set of teeth configured to engage the rack;
a control block;
a control rod configured to translate linearly within the control block; and
a control rod biasing element configured to bias the control rod into a locked orientation,
wherein:
the rack is disposed on the shaft;
the locking lever is disposed on the post;
the locking lever defines an engaged orientation where the teeth engage the rack and a disengaged orientation where the teeth disengage from the rack; and
the control rod is configured to force the locking lever into the engaged orientation when in the locked orientation.

12. The armrest of claim 11,
wherein the locking lever includes a cam element disposed to maintain contact with a surface of the control rod.

13. The armrest of claim 12, wherein the control rod defines a recessed portion disposed to coincide with the cam element when in an unlocked orientation.

14. The armrest of claim 11, the translating locking mechanism further comprising a locking lever biasing element configured to bias the locking lever into the disengaged orientation.

15. The armrest of claim 11, the translating locking mechanism further comprising a locking lever biasing element configured to bias the locking lever into the engaged orientation.

* * * * *